United States Patent [19]
Hallwood

[11] 3,812,886
[45] May 28, 1974

[54] CRYOGENIC INSULATION
[75] Inventor: Harry Hallwood, Arlington Heights, Ill.
[73] Assignee: Midwesco Enterprise, Inc., Chicago, Ill.
[22] Filed: July 5, 1972
[21] Appl. No.: 269,052

[52] U.S. Cl. ............................................. 138/149
[51] Int. Cl. ............................................. F16l 9/14
[58] Field of Search ..................... 138/149; 220/9 C

[56] References Cited
UNITED STATES PATENTS
| | | | |
|---|---|---|---|
| 3,369,826 | 2/1968 | Boosey et al. | 138/149 |
| 2,513,749 | 7/1950 | Schilling | 220/9 C |
| 3,628,572 | 12/1971 | Shannon | 138/149 |
| 3,665,968 | 5/1972 | DePutter | 138/149 |
| 2,901,775 | 9/1959 | Goff | 138/149 |

Primary Examiner—James J. Gill
Assistant Examiner—Anthony V. Ciarlante

[57] ABSTRACT

An insulating sleeve for use with transmission pipelines that carry liquid natural gas (LNG) at cryogenic temperatures, which insulator includes a tubularly-shaped bonded perlite core that is sealed in an envelope which is filled with a condensible gas such as carbon dioxide ($CO_2$). When the insulator is positioned near the cold transmission line, the $CO_2$ condenses thereby substantially evacuating the insulator, thus providing excellent insulation for the pipeline by reducing the heat gain to the LNG.

9 Claims, 3 Drawing Figures

PATENTED MAY 28 1974 3,812,886

CRYOGENIC INSULATION

BACKGROUND OF THE INVENTION

This invention relates to pipeline insulators which minimize heat gain to cryogenic fluids flowing through a transmission pipeline.

It is known that gases, such as natural gas, may be liquified at cryogenic temperatures (about −250° F.) to permit economical transport thereof by pumping the liquid through transmission pipelines. In order to maintain the gas as a liquid, heat gain to the liquid must be minimized. Insulating sleeves for the transmission pipes are logical and have been theoretically proposed, but the unusually low temperatures involved have made fulfillment of theory most difficult and expensive in practice.

At present, two commonly used cryogenic pipeline insulators are foam polyurethane and vacuum bottle-like sleeves. Foam polyurethane has a relatively high coefficient of thermal expansion so that the inner surface of the sleeve adjacent the pipeline (otherwise known as the cold face) contracts more than the outer surface of the sleeve. This difference in contraction creates a strain gradient which results in cracking of the sleeve at the cold face, thereby permitting increased heat gain to the LNG, as well as possible eventual mechanical failure of the sleeve.

Insulating sleeves have also been constructed of stainless steel envelopes, similar to the well-known vacuum bottle, wherein the space between the inner and outer stainless steel walls is evacuated so as to provide excellent insulating characteristics. In order to maintain these insulating characteristics, these sleeves must be maintained by periodic re-evacuation. Moreover, in order to protect the sleeve from being damaged, it is normally encased in a heavy and expensive protective jacket. Expanded perlite which is a granular, naturally occurring, siliceous volcanic rock with a low coefficient of expansion has been used as "loose-fill" in evacuated insulators. However, these insulators also required periodic re-evacuation to remain effective.

Therefore, it is an object of this invention to provide an insulator for use with cryogenic pipelines which practically satisfies, relatively inexpensively, the theoretical promise of a satisfactory insulator, and which does not require periodic re-evacuation and which has a coefficient of thermal expansion sufficiently low to prevent cracking at the cold face.

In U.S. Pat. No. 3,379,330 there is disclosed a non-structural-load-carrying insulating panel for spacecraft fuel storage tanks wherein a condensible gas is sealed in a plastic, substantially non-permeable, envelope with polyurethane separators so that when the panel is exposed to low temperatures, the gas condenses, thereby substantially evacuating said envelope by a process known as "cryopumping".

Therefore, it is another object of this invention to provide a pipeline insulator unit which employes cryopumping, whose skin construction provides substantially no permeability, and whose interior construction is such as to provide structural strength for the unit.

These and other objects of this invention will become apparent from the following description and appended claims.

SUMMARY OF THE INVENTION

There is provided by virtue of this invention a sleeve-like cryogenic pipeline insulator that minimizes the heat gain to the pipeline and employs cryopumping to establish an insulating vacuum. The insulator includes a molded shape-sustaining tubular core of bonded perlite which is sealed in a low permeability envelope filled with a condensible gas, such as carbon dioxide. When exposed to cryogenic temperatures, the gas condenses, thereby evacuating the envelope. At these temperatures, the bonded perlite core remains integral since it has a low coefficient of expansion and thus, there is only a small difference between the contraction at the cold face and at the outer surface. Moreover, the perlite core is sufficiently strong to support the pipeline without crushing.

Thus, the insulator need not be periodically re-evacuated and thereby provides an economical and practical cryogenic pipeline insulator.

DESCRIPTION OF THE PREFERRED EMBODIMENT

Figure 2:
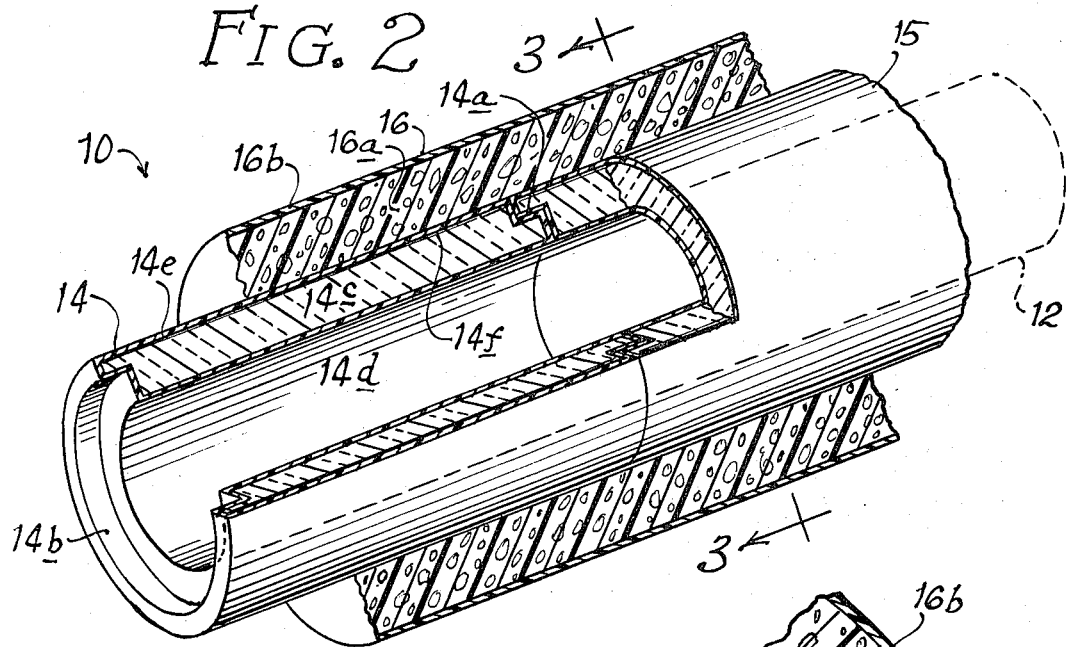
FIG. 2 is an enlarged, fragmentary, perspective view showing the protective jacket and insulator broken away and in section.
Figure 3:
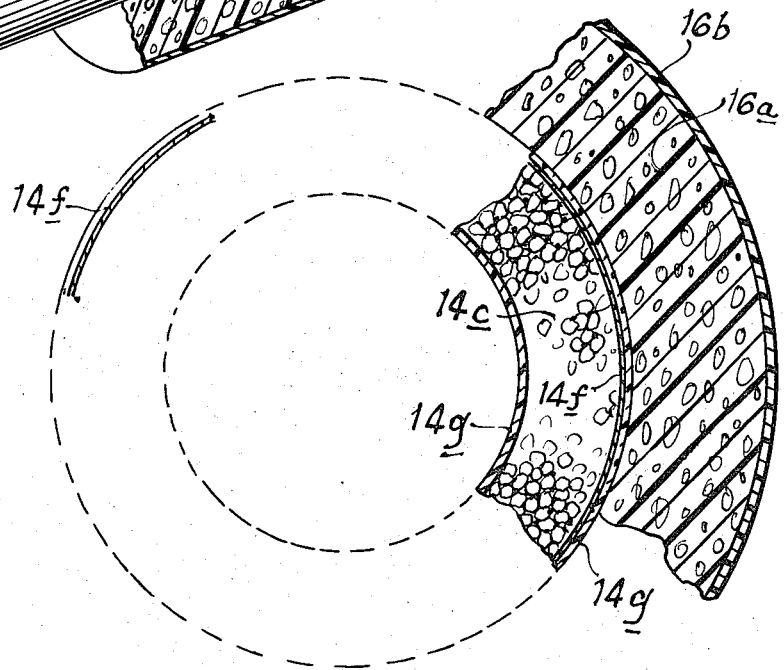
FIG. 3 is a greatly enlarged, fragmentary, cross-sectional view taken substantially along line 3—3 of FIG. 2.
Figure 1:
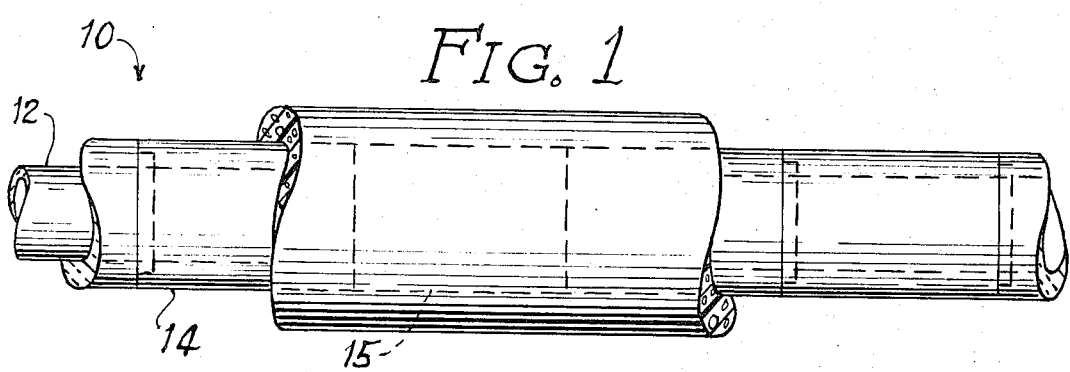
FIG. 1 is an elevational, fragmentary view showing a pipeline, insulator and protective jacket in accordance with this invention.

Referring now to the drawing, a pipeline and insulating assembly 10 generally, is shown which includes a pipeline 12 through which fluids, such as liquid natural gas, flow at cryogenic temperatures. The pipeline includes a plurality of interconnecting insulating sleeves, such as 14 and 15. The insulators include step-like end portions 14a and 14b for connecting one insulator section to another. These end connections define an indirect path between the inside surface 14d and outside surface 14e of the insulator and act to block infra-red transmission through the joint and to the pipeline 12. An insulating jacket 16 which includes a foam polyurethane core 16a and a fiberglass-resin covering 16b may be applied to the insulators where additional mechanical protection and environmental protection is necessary.

Each insulator includes a tubularly-shaped core 14c of expanded perlite grains bonded to each other. Perlite is a naturally-occurring, siliceous, volcanic rock which can be heated and thus expanded to 4 to 10 times its original volume. Expanded perlite has a density on the order of 2–3 pounds per cubic foot and consists essentially in weight percent of:

| | |
|---|---|
| $SiO_2$ | 71.0–75.0% |
| $Al_2O_3$ | 12.5–18.0% |
| $K_2O$ | 4.0–5.0% |
| $Na_2O$ | 2.9–4.0% |
| $CaO$ | 0.5–2.0% |
| $Fe_2O_3$ | 0.5–1.5% |
| $MgO$ | 0.1–0.5% |
| $TiO_2$ | 0.03–0.2% |

Additional data and information relating to perlite can be obtained from the Perlite Institute, Inc., 45 West 45th Street, New York, N.Y. 10036, and Silbrico Corporation, 6300 River Road, Hodgkins, Illinois 60525. The expanded perlite grains are bonded together at points along their surfaces so as to form a shape-sustaining core which is open-celled and has a density about that of the bonded perlite itself. A desirable density for the core is on the order of 2–3 pounds per cubic foot.

The perlite is bonded by using an inert bonding agent which consists of water, a gelling agent, and a catalyst. In the preferred embodiment, the gelling agent is a urea-formaldehyde catalyzed resin and the catalyst is a sodium bisulfate ($NaHSO_4$). The catalyst and gelling agent may be purchased from American Cyanamid Company, Explosives and Mining Chemicals Department, Wayne, N.J., under the trade name CYANALOC 62 Chemical Grout. As used by Cyanamid, the term "catalyst" refers to sodium bisulfate and "gelling agent" and is identified as S-3362. The chemical grout sets up by itself and, therefore, no heat or pressure is necessary.

The grout is added to the bonded perlite in amounts sufficient to dampen and hold the perlite grains together without clogging the pores therebetween which would close the open-cell structure. In a preferred embodiment, a solution of 50 percent by volume gelling agent and 50 percent by volume water is prepared and catalyst in the amount of 2 percent by weight of the total solution is added thereto. Perlite is then added to the solution in amounts to provide a core of the desired density and the mixture is then molded into the tubular sleeve and then permitted to "set-up" until it is shape-sustaining.

The infra-red shield 14f, in this case aluminum foil, is then applied over the outer surface of the sleeve and carbon dioxide is pumped from inside the sleeve into the core until substantially all the air in the core is replaced by carbon dioxide. The carbon dioxide fills the envelope at normal room temperature and at atmospheric pressure. The carbon dioxide filled core with the aluminum foil applied thereover is then covered on all surfaces with a plastic film which forms the envelope 14g that is sealed so as to completely enclose and encase the core 14c. The envelope may be made of urethane film which is hermetically sealed or it can be a liquid spray application of the urethane.

If the insulator is to be used in an underground installation where environmental protection is necessary, a protective cover may be formed and applied to prepared pipe and insulator sections. In that case, several insulator sections, such as 14 and 15 can be fitted to the pipeline 12 at the factory and a protective jacket consisting of foam polyurethane with a fiberglass reinforced resin cover can be applied thereover. Once the length of insulated and protected pipe is taken to the field, the pipe joints are welded and the remaining joints are closed in the field with split collar-like insulator sections, and a protective jacket.

Once the pipeline is assembled, liquid natural gas at approximately −250° F. is pumped through the insulated pipeline 12. The carbon dioxide in the insulator 14 condenses, thereby substantially evacuating the insulator. The perlite itself exhibits very low heat conductivity and the vacuum in the cells will not conduct heat. Thus, there is little, if any, heat transfer from outside the insulator to the pipeline. Infra-red radiation which penetrates the ground and outer protective jacket is blocked by the infra-red shield 14f which further reduces heat gain by the pipeline 12. Furthermore, the step-like end configurations 14a and 14b of each insulator prevents infra-red transmission through the joint. In the application as shown, there is a substantially continuous infra-red shield over at least a portion of each of the joints which thereby prevents radiation through the joint.

It will be appreciated that numerous changes and modifications may be made to the embodiment disclosed herein without departing from the spirit and scope of this invention.

What is claimed and desired to be secured by Letters Patent of the United States is:

1. In a cryogenic insulator for a transfer conduit wherein the insulator encloses a vacuum-tight space which is substantially filled by low heat conductive material, the improvement comprising, in combination:
   an open-celled, shape-sustaining, tubular core consisting essentially of bonded expanded-perlite grains and having an inner periphery selected to closely surround the transfer conduit;
   flexible, sealed envelope means closely surrounding the entire tubular core so that a portion of the envelope means is positioned to be interposed between the core and the transfer conduit;
   the space enclosed by the envelope means and including the voids of the cellulated core being occupied at ordinary temperatures by a gas that has the characteristic of condensing at unusually low temperatures to create a substantial vacuum within said gas space by cryopumping;
   the flexible envelope means operating to maintain a vacuum therewithin at temperatures below the temperature at which said gas condenses, and the shape and character of the core serving to provide structural strength for the insulator and to maintain the envelope means expanded to said core shape despite the vacuum existing in the flexible envelope at temperatures below the condensable temperature of the gas.

2. An insulator as in claim 1 wherein said gas is carbon dioxide.

3. An insulator as in claim 1 wherein there is further provided infra-red shield means disposed between the outer surface of said tubular core and said envelope for shielding said core from infra-red radiation.

4. An insulator as in claim 3 wherein said shield is an aluminum film.

5. An insulator as in claim 1 wherein the insulator is a sleeve-like member in which each end of said sleeve is provided with means for interconnecting with an adjacent sleeve, said interconnecting means being effective to block direct transmission of infra-red radiation through said connection to said pipeline.

6. An insulator as in claim 5 wherein said interconnecting means are step-like such that the end of one sleeve overlappingly receives the end of an adjacent sleeve.

7. An insulator as in claim 1 wherein said perlite grains are bonded together by a bonding agent which consists essentially of sodium bisulfate, urea-formaldehyde, catalyzed resin and water.

8. An insulator as in claim 1 wherein the density of the expanded perlite is in the range of about 2 to 3 pounds per cubic foot.

9. An insulator as in claim 1 which further includes outer protective covering means which comprise a layer of polyurethane foam adjacent said envelope means and a layer of fiberglass reinforced plastic resin thereover.

* * * * *